(12) United States Patent
Vandersteen et al.

(10) Patent No.: US 8,320,604 B1
(45) Date of Patent: Nov. 27, 2012

(54) COMPOSITE LOUDSPEAKER CONE

(76) Inventors: Richard Vandersteen, Hanford, CA (US); Michael P. Latvis, Jr., Buffalo, NY (US)

( * ) Notice: Subject to any disclaimer, the term of this patent is extended or adjusted under 35 U.S.C. 154(b) by 1014 days.

(21) Appl. No.: 12/108,053

(22) Filed: Apr. 23, 2008

Related U.S. Application Data

(60) Provisional application No. 60/915,588, filed on May 2, 2007.

(51) Int. Cl.
| | |
|---|---|
| *H04R 1/00* | (2006.01) |
| *H04R 7/00* | (2006.01) |
| *H04R 9/06* | (2006.01) |
| *H04R 11/02* | (2006.01) |
| *H04R 25/00* | (2006.01) |
| *B29C 47/00* | (2006.01) |

(52) U.S. Cl. ........ 381/428; 156/245; 181/157; 181/167; 181/169; 181/170; 381/152; 381/423; 381/426; 381/431

(58) Field of Classification Search ............... 381/428, 381/431; 181/169
See application file for complete search history.

(56) References Cited

U.S. PATENT DOCUMENTS

| | | | |
|---|---|---|---|
| 4,471,173 A | | 9/1984 | Winey |
| 4,517,416 A | * | 5/1985 | Goossens ............... 381/431 |
| 4,975,318 A | * | 12/1990 | Suda ................... 442/76 |
| 5,031,720 A | * | 7/1991 | Ohta et al. ............ 181/169 |
| 5,073,948 A | | 12/1991 | Vandersteen |
| 5,668,886 A | | 9/1997 | Sakamoto et al. |
| 5,701,359 A | * | 12/1997 | Guenther et al. ......... 381/431 |
| 5,832,096 A | * | 11/1998 | Hall ..................... 381/400 |
| 5,903,658 A | * | 5/1999 | Okazaki et al. ......... 381/428 |
| 5,907,133 A | * | 5/1999 | Agostinelli ............ 181/173 |
| 6,097,829 A | * | 8/2000 | Guenther et al. ........ 381/425 |
| 6,453,049 B1 | * | 9/2002 | Chu et al. .............. 381/152 |
| 6,790,506 B2 | * | 9/2004 | Lin et al. ............. 428/114 |
| 6,934,399 B2 | * | 8/2005 | Kam ................... 381/152 |
| 7,010,143 B2 | * | 3/2006 | Kam ................... 381/426 |
| 7,046,816 B2 | | 5/2006 | Vandersteen |
| 7,344,001 B2 | * | 3/2008 | Inoue et al. ............ 181/169 |
| 7,631,723 B2 | * | 12/2009 | Ono et al. ............. 181/169 |
| 2003/0223613 A1 | * | 12/2003 | Hachiya ................ 381/423 |
| 2004/0265564 A1 | * | 12/2004 | Tokura et al. ......... 428/316.6 |
| 2006/0018504 A1 | * | 1/2006 | Kam ................... 381/431 |
| 2006/0266577 A1 | * | 11/2006 | Inoue et al. ............ 181/167 |
| 2006/0269738 A1 | * | 11/2006 | Kimberly ............... 428/323 |
| 2007/0023423 A1 | * | 2/2007 | Suzuki et al. .......... 219/633 |
| 2007/0077442 A1 | * | 4/2007 | Scherble et al. ........ 428/473.5 |
| 2007/0132131 A1 | * | 6/2007 | Tokura et al. .......... 264/45.5 |
| 2008/0219469 A1 | * | 9/2008 | Simidian et al. ........ 381/92 |
| 2008/0307692 A1 | * | 12/2008 | Hagen et al. .......... 43/43.13 |

OTHER PUBLICATIONS

MATBASE, a leap forward in material data; Material Properties of Balsa Wood; http://www.matbase.com/material/wood/class4-5-10-years/balsa/properties.*
Answers.com/WikiAnswers; What is the Young's Modulus for balsa wood?; http://wiki.answers.com/Q/What_is_Young's_Modulus_for_balsa_wood.*

(Continued)

*Primary Examiner* — David Warren
*Assistant Examiner* — Christina Russell
(74) *Attorney, Agent, or Firm* — Michael Blaine Brooks, PC; Pejman Yedidsion; Michael B. Brooks

(57) ABSTRACT

Composite loudspeaker cones that include an interstitial layer of material having a core density below 600 kg/m$^3$ and a Young's modulus greater than 0.2 GPa, such as balsa wood, interposed between a first carbon fiber layer and a second carbon fiber layer and method of making same.

19 Claims, 5 Drawing Sheets

OTHER PUBLICATIONS

Yahoo! Answers; Does anyone know the value of youngs modulus for balsa wood?; http://answers.yahoo.com/question/index?qid=1006053125358.*

Robert Harley, "The Cutting Edge—Vandersteen Audio Model 7 Loudspeaker," The Absolute Sound, Oct. 2010, 112-121.
Michael Fremer, "Vandersteen Model 7 Loudspeaker," Stereophile, Mar. 2010, 79-88.

* cited by examiner

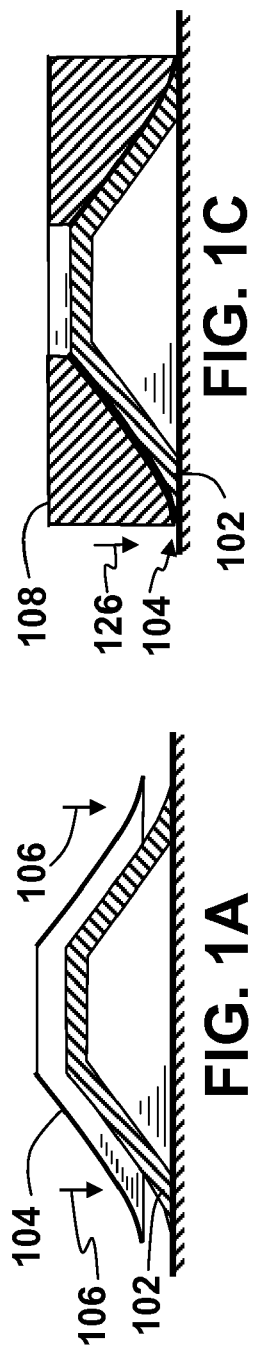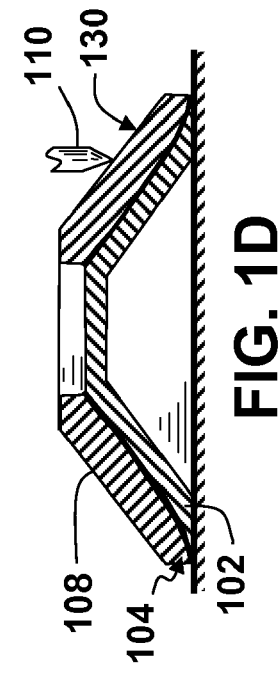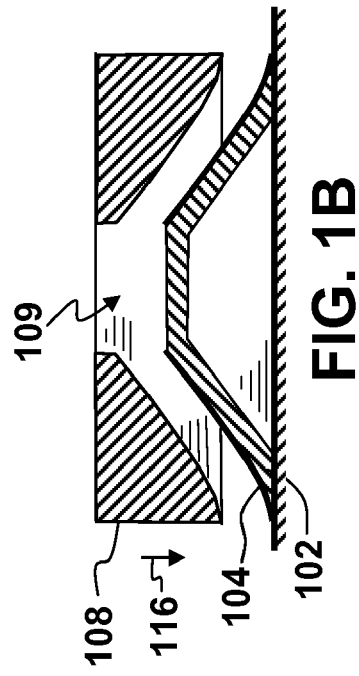

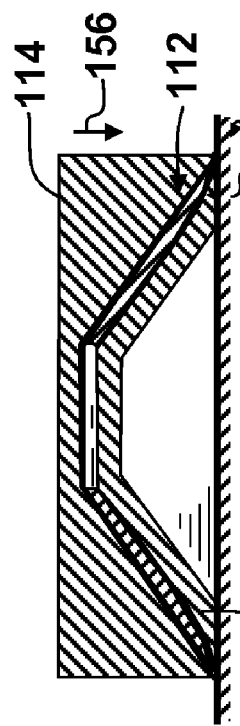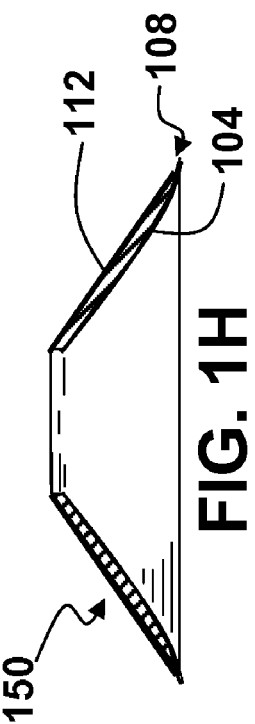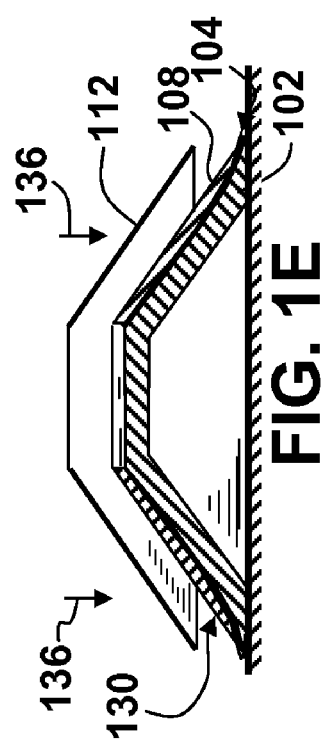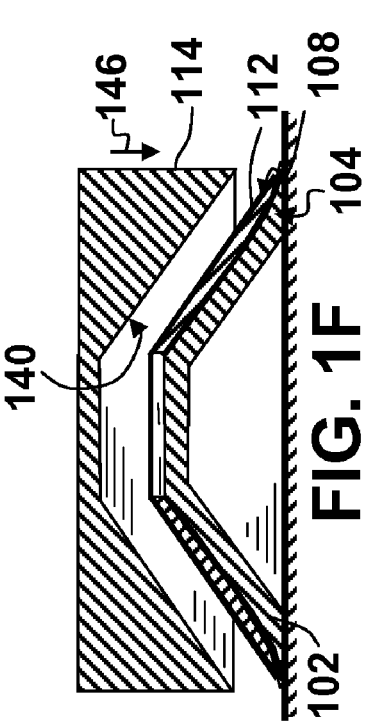

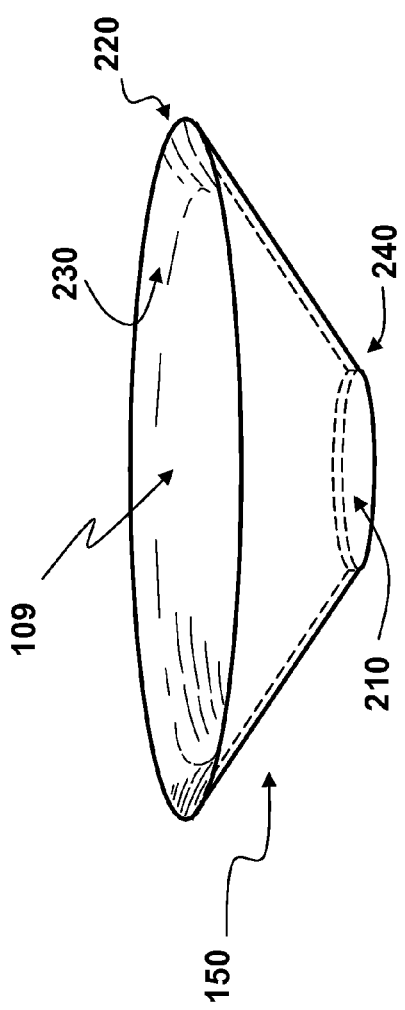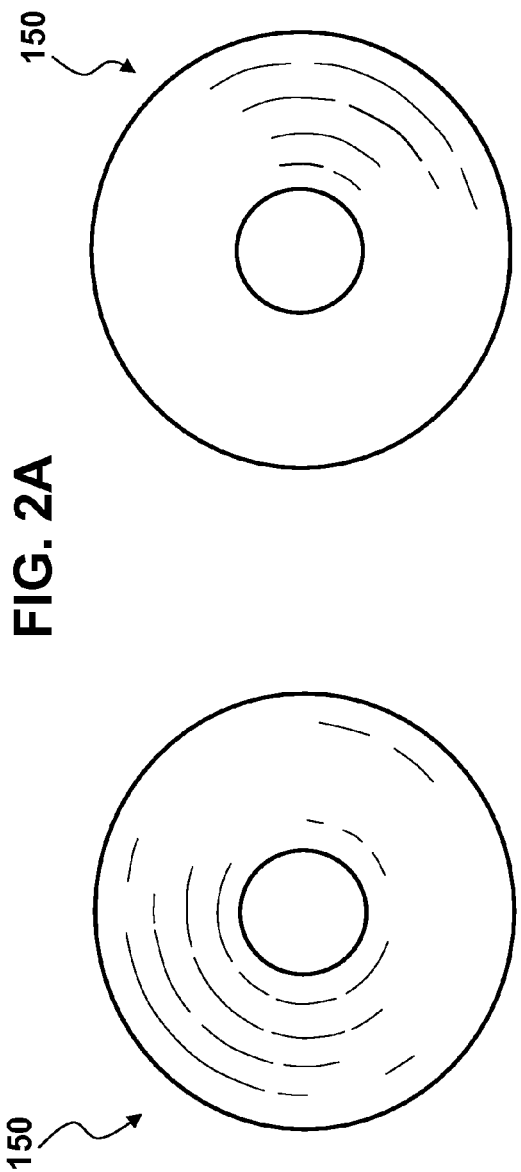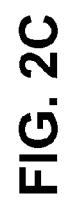

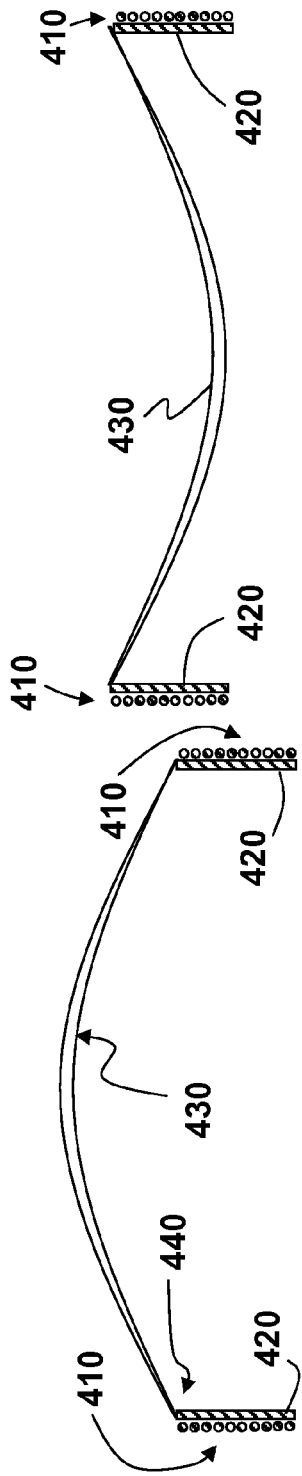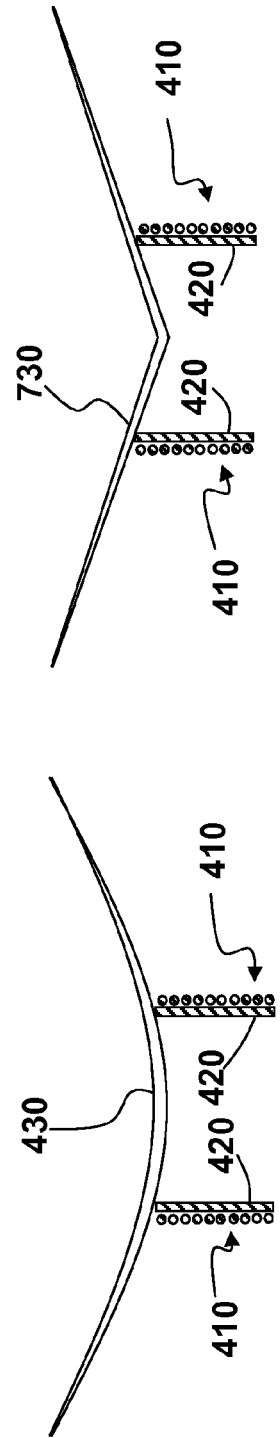

COMPOSITE LOUDSPEAKER CONE

CROSS-REFERENCE TO RELATED APPLICATION

This application claims the benefit of U.S. Provisional Patent Application Ser. No. 60/915,588, filed May 2, 2007, which is hereby incorporated herein by reference in its entirety for all purposes.

BACKGROUND

1. Technical Field

The invention, in its several embodiments, pertains to loudspeaker cones and more particularly to composite loudspeaker cones.

2. State of the Art

A loudspeaker cone may be described as an acoustical piston that, when in vibratory operation, increases and decreases air pressure over its surface as part of the role of a loudspeaker working as a transducer turning electrical signals into a recreation of the original sound represented by the electrical signals. A loudspeaker may be characterized as having a particular piston range where, within such a range, the sound pressure over the entire surface of the cone is in phase. When a cone enters a breakup mode, part of the cone moves one direction while another part of the cone moves in the opposite direction. In moving up the frequency range, the first occurrence of this bending or resonant behavior may be termed the first breakup mode of the cone, and the frequency range preceding the first breakup mode may be termed the "pistonic" range of the cone. Above the first breakup mode, the phase coherency necessary to support fully faithful stereophonic reproduction is difficult to maintain and is a source of distortion of the original sound.

Loudspeaker cones may be made from non-resonant material, i.e., materials that exhibit well-damped characteristics, in order to suppress lower frequency breakup modes and/or extend the pistonic frequency range. The type, location, and geometry of the non-resonant material of a loudspeaker cone, while extending the pistonic region, may adversely suppress percussive sounds. Accordingly, there exists a need for a loudspeaker cone having a wide pistonic region, i.e., a high frequency first breakup mode, that does not overly dampen the reproduction of percussive sounds.

A mechanical property that may be used to characterize a material for a composite loudspeaker is the density of the material, where less dense materials tend to act with less inertia and as such are more responsive to fluctuation in the magnetic field to which a voice coil is subjected. A second mechanical property that may be used to characterize a material for a composite loudspeaker is the Young's modulus (E) that can be determined by dividing the tensile stress of a material by the tensile strain of the material. Some materials, such as wood and carbon, have a Young's modulus that will change depending on which direction the force is applied, that is, they are anisotropic. When some materials are composites of two or more ingredients, they may exhibit a "grain" or similar mechanical structure indicative of being anisotropic. As a result, these anisotropic materials exhibit different mechanical properties based on the direction of the load. For example, a carbon fiber is stiffer, i.e., has a higher Young's modulus, when loaded parallel to, i.e., along the grain of, the fibers than when loaded perpendicular to the grain.

SUMMARY

The invention, in its several embodiments includes industrial methods of making a composite loudspeaker and the loudspeaker itself as an article of manufacture. For example, a method of making a loudspeaker cone may comprise (not necessarily in the following order): (a) providing an interstitial member having a Young's modulus of greater than 0.2 Gpa and a density below 600 Kg/m$^3$ which may be, for example, balsawood; (b) interposing a first layer of carbon fiber impregnated with epoxy between a first mold member and an interstitial member having a first surface substantially conformal to a proximate surface of the first mold member; (c) applying positive pressure to the first layer of carbon fiber impregnated with epoxy via the first mold member and the interstitial member; (d) milling a surface of the interstitial member opposite the first surface of the interstitial member; (e) interposing a second layer of carbon fiber impregnated with epoxy between the milled surface of the interstitial member and a second mold member with a surface substantially conformal and proximate to the milled surface of the interstitial member; and (f) applying positive pressure to the second layer of carbon fiber impregnated with epoxy via the second mold member and the first mold member, as transmitted by the first layer of carbon fiber and the milled interstitial member.

In addition, an exemplary loudspeaker structure may include a parabolic or frustroconical interstitial member wherein the parabolic or frustroconical interstitial member is interposed between a first carbon fiber layer and a second carbon fiber layer and the interstitial member has a Young's modulus of greater than 0.2 Gpa and a density below 600 Kg/m$^3$, such as balsawood. The exemplary interstitial member, if frustroconcial, may further comprise a frustroconical cavity.

BRIEF DESCRIPTION OF THE DRAWINGS

For a more complete understanding of the present invention and for further features and advantages, reference is now made to the following description taken in conjunction with the accompanying drawings, in which:

FIG. 1A shows a cross-sectional view of an exemplary embodiment of the present invention, the application of a first layer, or skin, to a first mold portion;

FIG. 1B shows a cross-sectional view of an exemplary embodiment of the present invention, the application of an interstitial member to the first layer, or skin, already applied to the first mold portion;

FIG. 1C shows a cross-sectional view of an exemplary embodiment of the present invention, the application of pressure to the interstitial member and the first layer, or skin, already applied to the first mold portion;

FIG. 1D shows a cross-sectional view of an exemplary embodiment of the present invention, the application of a milling tool to the interstitial member;

FIG. 1E shows a cross-sectional view of an exemplary embodiment of the present invention, the application of a second layer, or second skin, to the milled side of interstitial member;

FIG. 1F shows a cross-sectional view of an exemplary embodiment of the present invention, the application of a second mold portion to the second layer, or second skin;

FIG. 1G shows a cross-sectional view of an exemplary embodiment of the present invention, the application of pressure via the second mold portion to the second layer, or second skin;

FIG. 1H shows a cross-sectional view of an exemplary embodiment of the present invention, a loudspeaker cone comprising the interstitial member interposed between the first layer and the second layer;

FIG. 2A shows a perspective view of an exemplary loudspeaker cone embodiment of the present invention;

FIG. 2B shows a top plan view of an exemplary loudspeaker cone embodiment of the present invention;

FIG. 2C shows a bottom plan view of an exemplary loudspeaker cone embodiment of the present invention;

FIG. 4 shows an exemplary orientation, in cross-sectional side view of a voice coil relative to an exemplary composite loudspeaker cone of the present invention;

FIG. 5 shows an exemplary orientation, in cross-sectional side view of a voice coil relative to an exemplary composite loudspeaker cone of the present invention;

FIG. 6 shows an exemplary orientation, in cross-sectional side view of a voice coil relative to an exemplary composite loudspeaker cone of the present invention; and FIG. 7 shows an exemplary orientation, in cross-sectional side view of a voice coil relative to an exemplary composite loudspeaker cone of the present invention.

DETAILED DESCRIPTION

Figure 3:
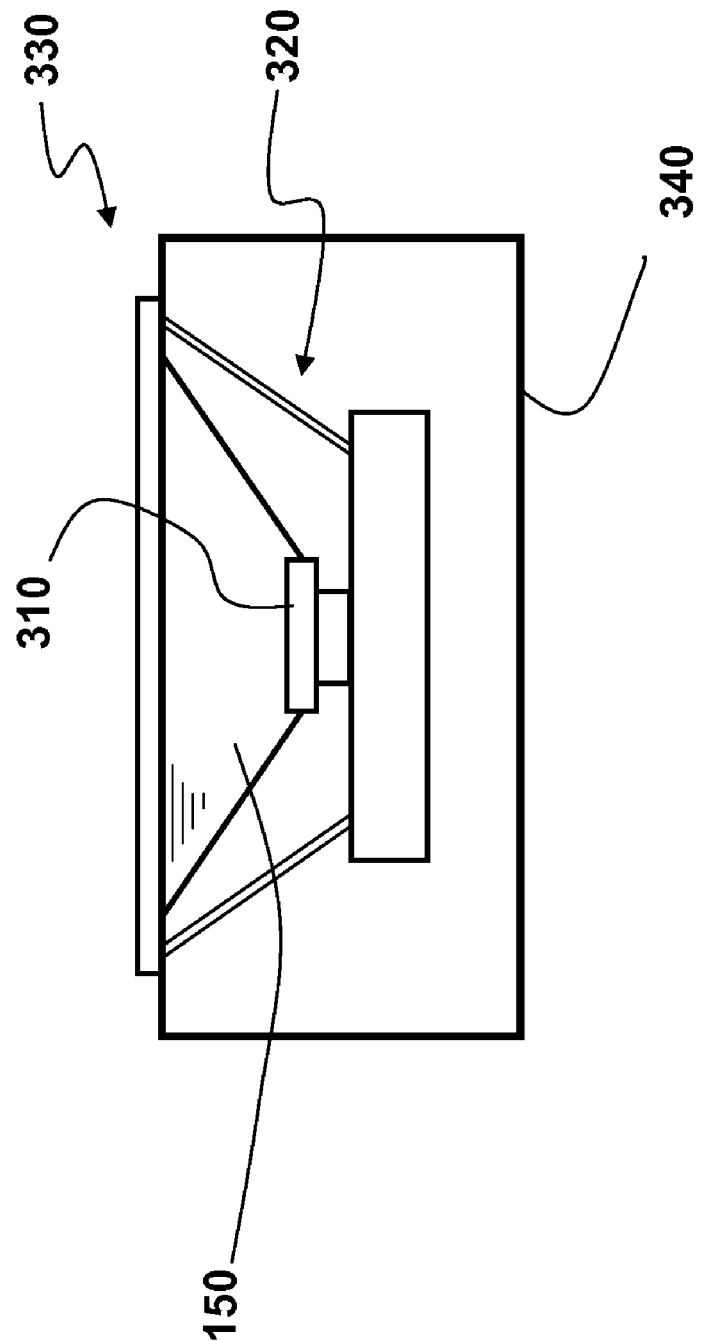
FIG. 3 shows a side view of an exemplary embodiment of the present invention, a loudspeaker cone mounted with cone suspension and surround within the cross-section of a speaker housing cabinet.

The invention in its several embodiments includes composite loudspeaker cones having high pistonic ranges and methods of making the same. An exemplary composite loudspeaker cone may comprise a first layer of carbon fiber 104, an interstitial layer of material preferably having a density below 600 kilograms per cubic meter (kg/m$^3$) and a Young's Modulus of greater than 0.2 gigapascals (Gpa) and a second layer of carbon fiber. The interstitial layer may comprise a soft commercial hardwood, such as balsawood. As shown in FIGS. 1A-1H, the exemplary composite loudspeaker cone may be made by applying 106 a layer of carbon fiber 104, 2.4 ounce bi-directional carbon fiber impregnated with epoxy, e.g., West Systems #105, i.e., as a wet lay up to the concave frustroconical surface of what may be termed the "female" mold portion or member 102. A disk or block of interstitial material, such as balsawood 108, also termed a balsawood member, having a frustroconical cavity 109 may then be applied 116 under pressure 126, e.g., 50 lbs pressure, to the first layer of carbon fiber 104 and the pressure may be applied until the layer of carbon fiber is cured. The curing of the layer of carbon fiber 104 may require about an hour and may be accelerated by placing the first stage article under work (i.e., the first carbon fiber layer 104, the balsawood member 108 and first mold fixture 102) in an oven at temperatures above room temperature and below the flashpoints of the selected epoxy and the balsawood.

Once the layer of carbon fiber 104 is cured or at least once the first carbon layer 104 is fixed to the balsawood member 108, the article, particularly the balsawood portion 108, may be milled via a tool 110 to reduce the thickness of the balsawood layer, at its thickest point, to about 0.1 inch for midrange loudspeaker embodiments and to about 0.25 inch for woofer loudspeaker embodiments. A second layer of carbon fiber 112 impregnated with epoxy may be applied 136 to the milled balsawood surface 130 and a second mold portion 114 having a convex frustroconical surface 140 (where the second mold portion 114 may be termed the "male" mold portion) may be applied 146 to the second layer of carbon fiber 112 impregnated with epoxy under pressure 156, e.g., 50 lbs pressure, to the second layer 112 of carbon fiber and the pressure may be applied 156 until the second layer of carbon fiber is cured. The curing of the second layer of carbon fiber may require about an hour and may be accelerated by placing the second stage article under work (i.e., first mold fixture 102, the first carbon layer 104, the milled balsawood member 108, second carbon fiber layer 112 and second mold fixture 114) in an oven at temperatures above room temperature and below the flashpoints of the epoxy and the balsawood. Once the second layer 112 of carbon fiber is cured, or at least once the second layer 112 of carbon fiber adheres to the balsawood milled surface 130, a frustroconical composite loudspeaker cone 150, comprising the milled balsawood member 108 interposed between the first carbon fiber layer 104 and the second carbon layer 112, is extracted from both mold portions 102, 114 and may form the cone of a loudspeaker. The industrial process described herein may be applied to other shapes of loudspeaker bells including parabolic bells.

FIG. 2A illustrates, in a perspective view, the exemplary frustroconical composite loudspeaker cone 150 embodiment having a frustroconical cavity 109, a voice coil aperture 210 and illustrates in this view that the inner surface 230 of the cone 150 may have a flare or curvilinear shape tapering to distal rim 220 and that the thickness of the cone 150 may be its thickest 240 proximate to the voice coil aperture 210. FIGS. 2B and 2C respectively illustrate, in a top plan view and a bottom plan view, the exemplary frustroconical composite loudspeaker cone 150 embodiment. FIG. 3 illustrates a side view of an exemplary embodiment of the present invention in use, the frustroconical composite loudspeaker cone 150 with a voice coil 310 mounted with cone suspension 320 and surrounded 330 within the cross-section of a speaker housing 340 or cabinet.

The exemplary article for a midrange loudspeaker may taper from a thickness, proximate to the typical center location of a speaker coil, of 0.1 inch to zero at the outer face in a curvilinear fashion. The coil diameter is about 1.0 inches and the diameter of the article is about 3.3 inches. When mounted within a typical chassis, the midrange loudspeaker may have a diameter of 4.5 inches. The exemplary article for a woofer loudspeaker may taper from a thickness, proximate to the typical center location of a speaker coil, of 0.25 inches to zero at the outer face in a curvilinear fashion. The woofer coil diameter is about 5.0 inches and the diameter of the article is about 4.25 inches. When mounted with a typical chassis, the woofer is about 7 to 8 inches in diameter.

In operation, the carbon-balsa-carbon composite cone of a loudspeaker supports pistonic operation, that is, operation as an acoustical piston, over a wide audio range up to a first break up mode by dampening cone resonance. In addition, the carbon-balsa-carbon composite cone attenuates housing acoustical reflections that may otherwise propagate via the cone portions of conventional materials and fabrication methods.

The exemplary disk or block of balsa wood has a grain orientation that generally may run in any direction relative to the conic base of the frustroconical cavity and for some applications may have its grain running perpendicular to the conic base, i.e., cross grain, or may have its grain running parallel to the conic base, i.e., end-grained.

The first layer and second layer, or "skins," that are the material between which the balsawood member may be interposed, may comprise Kevlar® fabrics, plastic sheets, metallic sheets, such as aluminum sheets or alloy sheets, woven fiberglass and paper, in place of or in addition to carbon fiber described above. In addition to the balsawood member, a volume of hex cell (e.g., beehive) spacers, foam spacers, and/or Nomex® may, in addition to the balsawood, be interposed between the first layer and the second layer.

A voice coil may be disposed at one of several locations about the composite loudspeaker bell or cone of the types described above. For example, FIG. 4 shows an exemplary orientation, in cross-sectional side view of a voice coil 410 and a voice coil bobbin 420, or voice coil former, that is relative to an exemplary composite loudspeaker cone 430 of the present invention where the voice coil has a helical diameter or winding diameter approximately that of the parabolic cone and disposed proximate to the outer edge of the bell 440 and FIG. 5 shows a second exemplary orientation, in cross-sectional side view of a voice coil relative to an exemplary composite loudspeaker cone of the present invention where the voice coil is disposed opposite that of the one illustrated in FIG. 4. The voice coil may have a winding diameter smaller than the outer diameter of the cone and be placed proximate to the center of the parabolic bell as shown in FIG. 6. The exemplary orientation of FIG. 6 may also apply to a composite cone 730, as shown in FIG. 7.

Alterations and variations may be made by those having ordinary skill in the art without departing from the spirit and scope of the invention. Therefore, it must be understood that the illustrated embodiments have been set forth only for the purposes of example and as such should not be taken as limiting the invention as defined by the following claims.

The invention claimed is:

1. A loudspeaker structure comprising an interstitial member wherein the interstitial member is interposed between a first carbon fiber layer and a second carbon fiber layer, wherein the interstitial member is a conical balsawood member, the interstitial member has a Young's modulus of greater than 0.2 Gpa and a density below 600 Kg/m$^3$, and the interstitial member defines a resonant behavior to allow a high pistonic frequency range, wherein the high pistonic frequency range is a wide audio range up to a high frequency first break up mode.

2. The loudspeaker structure of claim 1 wherein the interstitial member is a parabolic interstitial member.

3. The loudspeaker structure of claim 1 wherein the interstitial member is a frustroconical interstitial member.

4. The loudspeaker structure of claim 3 wherein the interstitial member further comprises a frustroconical cavity.

5. The loudspeaker structure of claim 3 wherein the interstitial member is a parabolic balsawood member.

6. The loudspeaker structure of claim 1 wherein the interstitial member is a frustroconical balsawood member having a frustroconical cavity.

7. The loudspeaker structure of claim 1 wherein the interstitial member comprises solid balsawood, wherein the solid balsawood is a continuous piece of balsawood.

8. A method of making a loudspeaker cone comprising:
providing an interstitial member having a Young's modulus of greater than 0.2 Gpa and a density below 600 Kg/m$^3$;
interposing a first layer of carbon fiber impregnated with epoxy between a first mold member and an interstitial member having a first surface substantially conformal to a proximate surface of the first mold member;
applying positive pressure to the first layer of carbon fiber impregnated with epoxy via the first mold member and the interstitial member;
milling a surface of the interstitial member opposite the first surface of the interstitial member;
interposing a second layer of carbon fiber impregnated with epoxy between the milled surface of the interstitial member and a second mold member a surface substantially conformal and proximate to the milled surface of the interstitial member; and
applying positive pressure to the second layer of carbon fiber impregnated with epoxy via the second mold member and the first mold member, as transmitted by the first layer of carbon fiber and the milled interstitial member.

9. The method of making a loudspeaker cone of claim 8 wherein the interstitial member comprises balsawood.

10. The method of making a loudspeaker cone of claim 8 wherein the interstitial member is a parabolic interstitial member.

11. The method of making a loudspeaker cone of claim 8 wherein the interstitial member is a frustroconical interstitial member.

12. The method of making a loudspeaker cone of claim 8 wherein the interstitial member further comprises a frustroconical cavity.

13. The method of making a loudspeaker cone of claim 8 wherein the interstitial member is a frustroconical balsawood member having a frustroconical cavity.

14. The method of making a loudspeaker cone of claim 8 wherein the interstitial member is a parabolic balsawood member.

15. The method of making a loudspeaker cone of claim 8 wherein the interstitial member comprises solid balsawood, wherein the solid balsawood is a continuous piece of balsawood.

16. A loudspeaker structure comprising an interstitial member wherein the interstitial member is interposed between a first carbon fiber layer and a second carbon fiber layer, and the interstitial member is a frustroconical balsawood member defining a frustroconical cavity and a resonant behavior to allow a high pistonic frequency range, wherein the high pistonic frequency range is a wide audio range up to a high frequency first break up mode.

17. The loudspeaker structure of claim 16 wherein the interstitial member has a Young's modulus of greater than 0.2 Gpa and a density below 600 Kg/m$^3$.

18. The loudspeaker structure of claim 16 wherein a portion of the frustroconical balsawood member comprises a bell-shape.

19. The loudspeaker structure of claim 16 further comprising the frustroconical balsawood member defining a dampening of cone resonance.

* * * * *